Sept. 15, 1936.  E. FULTON  2,054,724
FREEZER MECHANISM
Filed Aug. 30, 1933  3 Sheets-Sheet 1
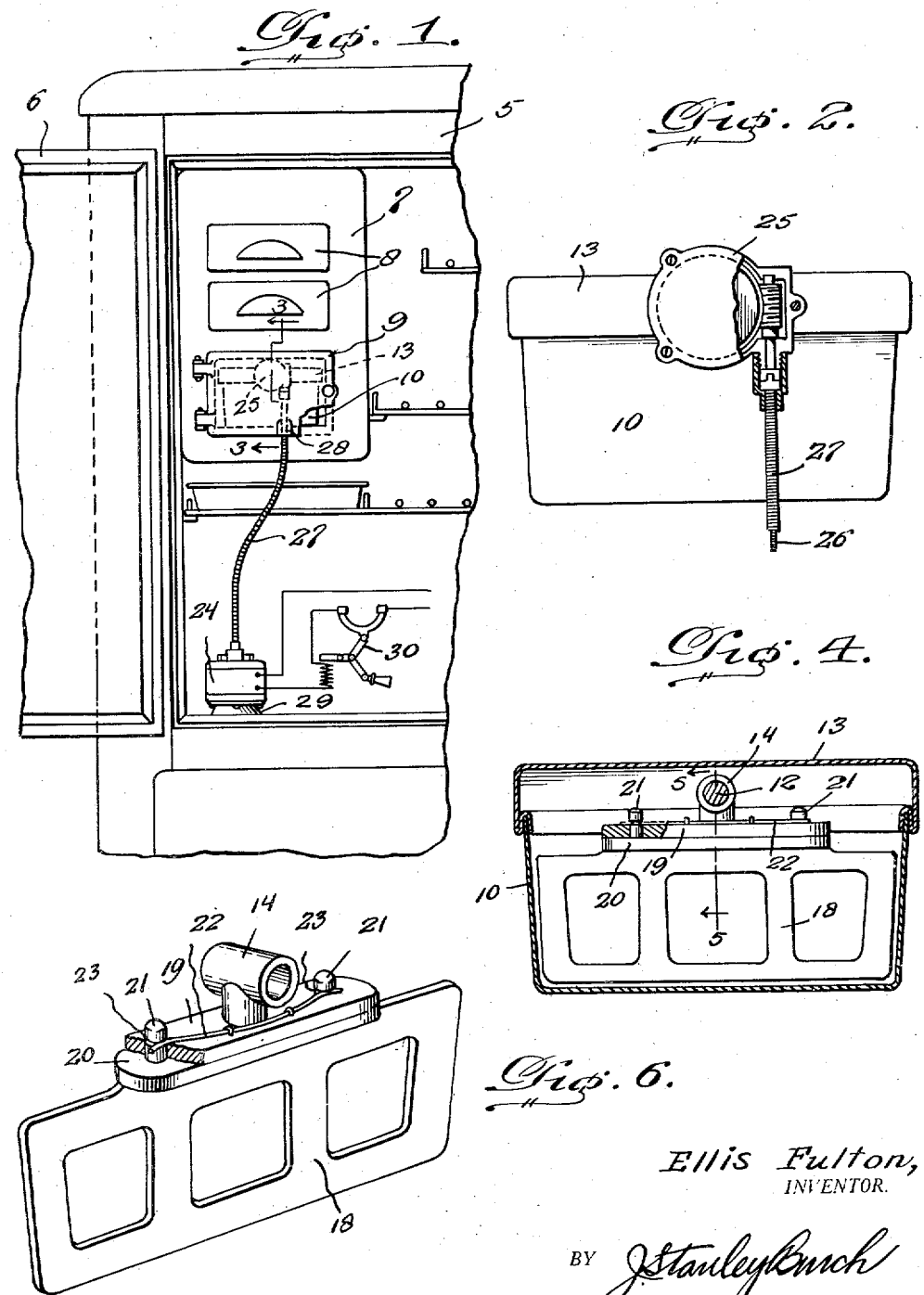
Ellis Fulton,
INVENTOR.
BY J. Stanley Burch
ATTORNEY.

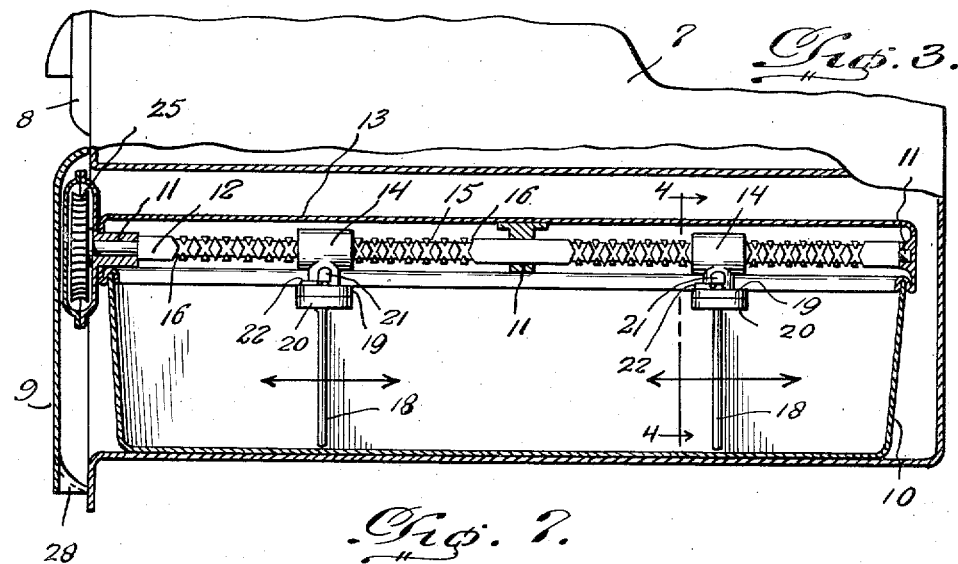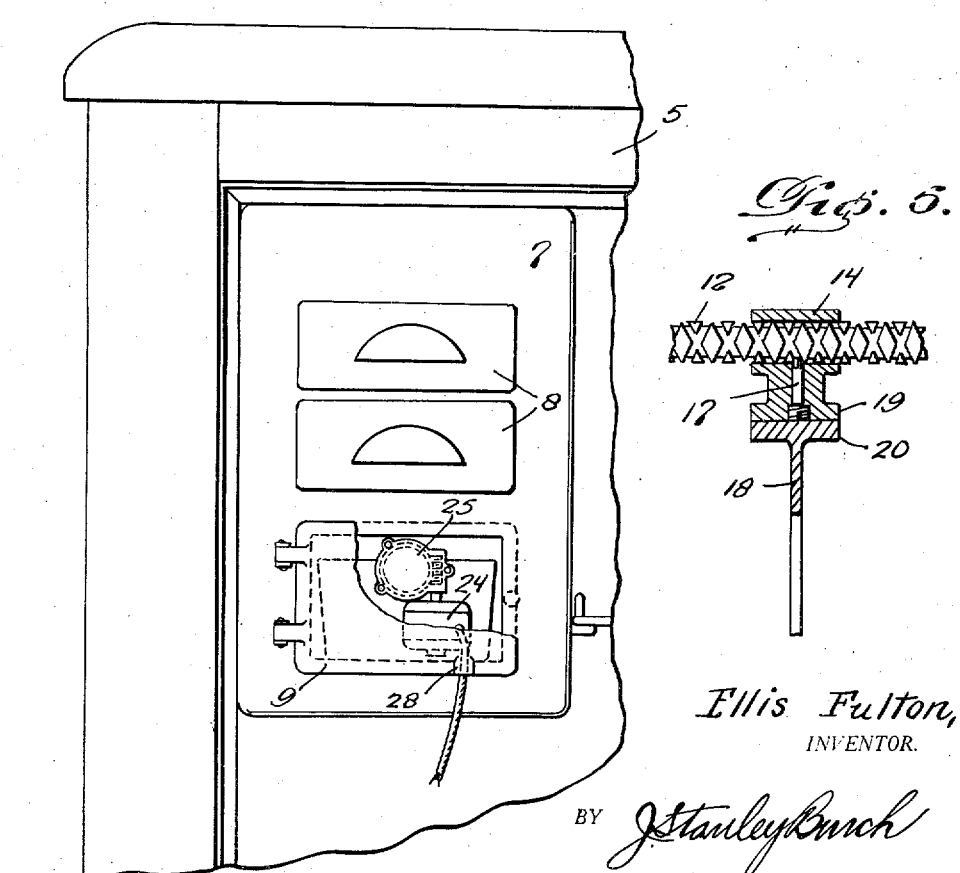

Sept. 15, 1936.  E. FULTON  2,054,724
FREEZER MECHANISM
Filed Aug. 30, 1933  3 Sheets-Sheet 3
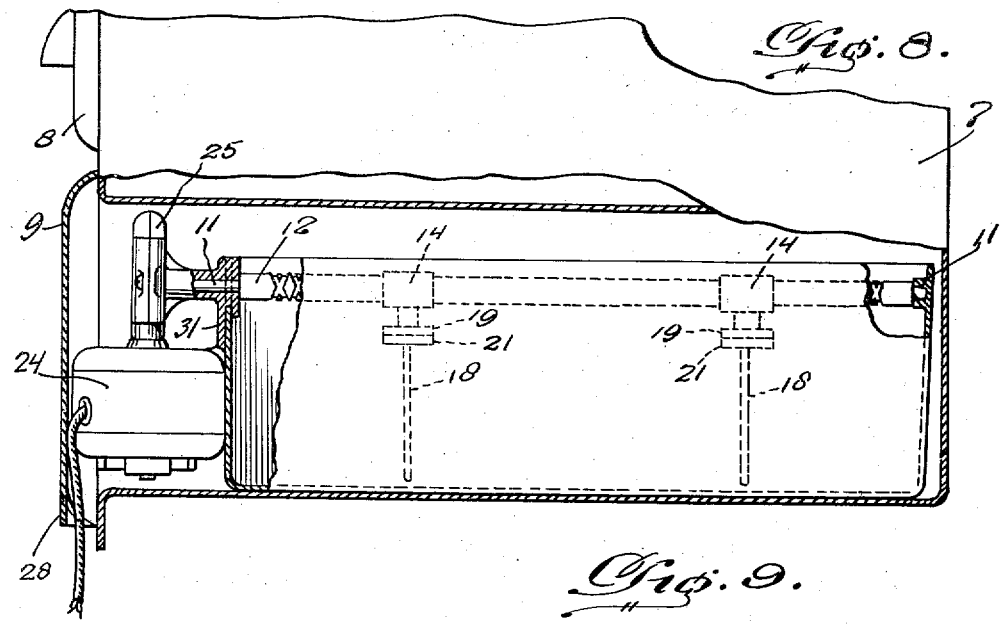
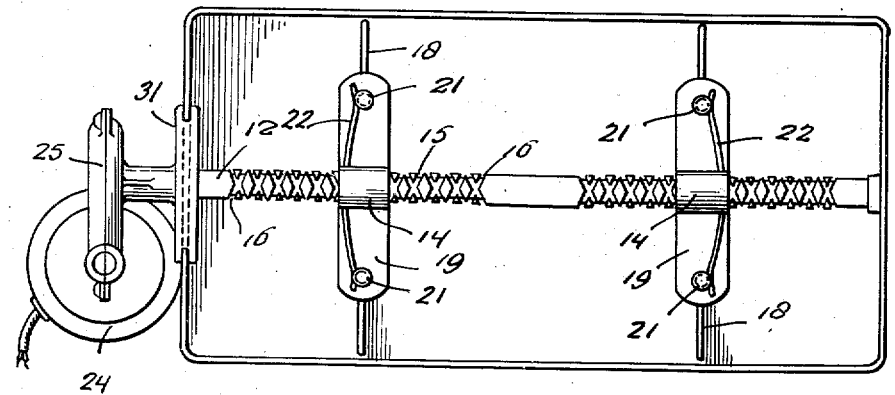
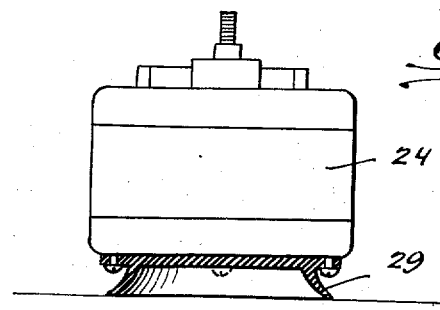
Ellis Fulton,
INVENTOR.
BY J Stanley Burch
ATTORNEY.

Patented Sept. 15, 1936

2,054,724

UNITED STATES PATENT OFFICE 2,054,724

FREEZER MECHANISM

Ellis Fulton, Wheeling, W. Va.

Application August 30, 1933, Serial No. 687,528

6 Claims. (Cl. 62—114)

This invention relates to an improved freezer mechanism for use in connection with automatic domestic refrigerators.

Automatic domestic refrigerators invariably embody a refrigerating unit defining an enclosed refrigerating chamber having compartments for the removable reception of a plurality of drawers or trays to contain the material to be frozen. However, the proper preparation of ices, ice cream and like food stuffs not only requires chilling or freezing, but also agitation or stirring of the material during the freezing operation. Such stirring or agitation of the material has ordinarily been accomplished by hand upon opening of the door of the refrigerator from time to time and removal or partial removal of the tray or trays. This procedure is objectionable because of the inconvenience involved and because of the fact that repeated opening of the refrigerator door necessarily retards the freezing operation.

The primary object of the present invention, therefore, is to provide an improved freezer mechanism by means of which the above objections are effectively overcome, such freezer mechanism including a freezer receptacle adapted for removable reception in one of the compartments of the refrigerating unit of the refrigerator so that the material in such receptacle is subjected to the refrigerating action of the refrigerating unit, stirring or agitating means associated with said freezer receptacle, and power means for operating said stirring or agitating means having means to removably mount the same within the refrigerator, whereby the material to be frozen may be continuously stirred or agitated during the freezing operation while the door of the refrigerator is closed and maintained in closed condition until completion of the freezing operation.

A further object is to provide an improved freezer mechanism of the above kind including an elongated pan-like freezer receptacle within which is arranged a stirrer or stirrers, mounting and actuating means for said stirrer or stirrers associated with said receptacle and operable to effect continuous reciprocation of the stirrer or stirrers longitudinally of the freezer receptacle, and a motor for operating said stirrer actuating means.

A still further object of the present invention is to provide a freezer mechanism of the above kind wherein the operating motor may be conveniently placed and removably mounted within the refrigerator below the refrigerating unit, and wherein the installation of the freezer mechanism within existing automatic domestic refrigerators will not require any or material alteration of the refrigerator.

Further objects are to provide stirring or agitating means of a novel and efficient construction; to provide means for the ready removal of the stirrer or stirrers from its or their actuating means; and to provide means whereby the stirrer operating motor may be automatically thrown out of operation when the consistency of the frozen material is of the proper stiffness such as to offer a predetermined resistance to movement of the stirrer or stirrers.

Additional objects and features of the invention will become apparent from the following description when considered in connection with the accompanying drawings, in which:

Figure 1 is a fragmentary front elevational view of an automatic domestic refrigerator having installed therein a freezer mechanism constructed in accordance with the present invention, the front door of the refrigerator being open.

Figure 2 is an enlarged view of the freezer receptacle partly in front elevation and partly broken away and in section to reveal the gearing operatively connecting the drive shaft and the driven stirrer actuating shaft.

Figure 3 is an enlarged fragmentary vertical section on line 3—3 of Figure 1.

Figure 4 is a vertical transverse section on line 4—4 of Figure 3.

Figure 5 is a fragmentary vertical longitudinal section on line 5—5 of Figure 4.

Figure 6 is an enlarged perspective view, partly broken away and in section, of one of the stirrers and its associated carrier forming part of the stirrer actuating mechanism.

Figure 7 is a view somewhat similar to Figure 1 showing a modification of the invention.

Figure 8 is a view somewhat similar to Figure 3 of the modification shown in Figure 7.

Figure 9 is a top plan view of the freezer receptacle and associated parts shown in Figures 7 and 8, removed from the freezing chamber compartment of the refrigerating unit of the refrigerator; and Figure 10 is a view partly in elevation and partly in section showing the vacuum cup employed on the motor of the form of the invention shown in Figure 1 to facilitate mounting of the motor against accidental movement and for ready manual removal relative to the refrigerator.

Referring in detail to the drawings, 5 indicates the cabinet of a conventional automatic domestic refrigerator, having a suitable front door 6 to facilitate access to the interior thereof, and within which is arranged a suitable refrigerating unit 7 defining an enclosed refrigerating chamber in a manner well known in the art. This refrigerating chamber is provided with the usual superposed compartments adapted for removable reception of drawers or trays 8 to contain material to be frozen.

The lowest compartment of the refrigerating chamber is ordinarily of greater vertical depth than the others for reception of a relatively deeper freezing tray or receptacle, such lowest compartment being closed at the front in certain models of refrigerators of this type by a hinged door 9, as shown. The present invention includes a relatively deep pan-like freezer receptacle 10 adapted to be placed in the lowest compartment of the refrigerating chamber in lieu of the pan ordinarily placed therein, said receptacle 10 being of such length as to leave an unoccupied space in front of the same at the front of the associated compartment, for purposes which will presently become apparent. Journaled at 11 near the top of receptacle 10 centrally and longitudinally of the latter is a horizontal stirrer-actuating shaft 12 which may be either journaled in the end walls of a cover 13 for said receptacle 10 as more clearly shown in Figure 3, or which may be directly journaled in the end walls of the receptacle 10 as illustrated more clearly in Figures 8 and 9. In the preferred construction of the invention, a stirrer carrier 14 is slidably mounted upon each end portion of actuating shaft 12, and each end portion of shaft 12 is provided with a pair of intersecting right and left hand threads or spiral grooves as at 15 which are connected at their opposite ends as at 16 to be alternately engaged by an internally projecting key or pin 17 carried by the associated stirrer carrier 14 (see Figure 5). A stirrer 18 is detachably connected to each carrier 14 so as to depend therefrom within and to a point adjacent the bottom of receptacle 10. This construction and arrangement is such that upon continuous rotation of shaft 12 in one direction, the carriers 14 and their attached stirrers 18 are continuously reciprocated back and forth within receptacle 10, each stirrer traversing a path approximating one-half the length of receptacle 10. The carriers 14 are preferably initially arranged so that they are moved to alternately travel toward and then away from each other, with a corresponding movement being given to the stirrers 18 attached to said carriers 14. In this way, thorough mixing of the ingredients of the material to be frozen is insured by a mechanism which is simple, durable and efficient. Any suitable means may be provided for connecting the stirrers 18 to the carriers 14 so as to permit ready connection or disconnection of said stirrers thereto and therefrom. As shown, each carrier 14 has a depending rigid plate-like portion 19 adapted for flat engagement with the upper surface of a similar plate-like portion 20 rigid with the top of the associated stirrer 18, the portion 19 having end openings for reception of pins 21 rigid with and rising from the plate-like portion 20, and said portion 19 having a spring 22 or like detent member or members adapted to automatically snap into grooves 23 provided in the pins 21 when the stirrer is assembled to its carrier, said detent or detent members being manually disengageable from the grooves 23 of pins 21 to effect disconnection of the stirrer from its associated carrier when desired. This permits ready removal of the stirrers for cleaning or any other desired purpose, such as to facilitate discharge of the frozen material from receptacle 10 at the completion of each freezing operation. Obviously, handling of the receptacle for discharge of the frozen material is greatly facilitated where the shaft 12 is mounted on the removable cover 13 of receptacle 10 as illustrated in Figures 1 to 4 inclusive.

The shaft 12 projects at the front end of receptacle 10 for operative connection to an operating motor 24, the hereinbefore mentioned space left at the front of the associated compartment of the refrigerating chamber in front of the receptacle 10 being provided to accommodate the elements of this operative connection as shown in Figures 1 and 3, or to also accommodate the motor 24 in the embodiment of Figure 8.

In the form of the invention shown in Figures 1 to 3 inclusive, the operative connection between motor 24 and shaft 12 includes an encased worm gearing 25 having its casing mounted upon the adjacent forward end of cover 13, the worm gear of said gearing being secured on the projecting forward end of shaft 12 and being in constant mesh with the worm of said gearing as shown in Figure 2, said worm being connected to one end of a flexible shaft 26 having a flexible casing 27 and operatively connected at its other end with the power or armature shaft of motor 24. The shaft 26 is of sufficient length to extend from the freezer receptacle 10 a sufficient distance to permit mounting of motor 24 upon a suitable wall of the refrigerator cabinet below the refrigerating unit 7, such as upon the bottom wall of the storage compartment of the refrigerator as shown in Figure 1. In case the door 9 is used and it is desired to retain the same, it may have a suitable opening or offset portion 28 to permit the flexible shaft 26 to extend to a point inwardly of the door 9 when the latter is closed.

The motor 24 is preferably of a conventional rotary electric type, and in order to mount the same upon the wall of the refrigerator within the storage compartment of the latter for ready manual removal and against accidental lateral displacement, a suction cup 29 is attached to the casing of the motor at the side or end opposite that from which the flexible shaft 26 extends. By giving this suction cup a non-circular form, axial turning of the motor field and casing may be effectively opposed by said suction cup even though a certain resistance is offered to the turning of the power or armature shaft of said motor as the material to be frozen in receptacles 10 stiffens during the freezing operation. It is especially pertinent that due to the yielding or resilient nature of the suction cup 29, said motor will be smooth and noiseless in operation.

In all forms of the invention, a suitable overload switch 30 may be incorporated in the current feed line of motor 24 as diagrammatically illustrated in Figure 1 for automatically throwing the motor 24 out of operation when a predetermined resistance to the movement of stirrers 18 is offered by the frozen material when the latter obtains a desired stiffness or consistency. As is usual with automatic over-load switches of this type, they must be manually reset for again placing the motor in operation such as is necessary when it is desired to freeze a new batch of material.

In the construction of Figures 7 to 9 inclusive, the flexible shaft 26 is dispensed with, the power shaft of motor 24 being directly connected with the worm of gearing 25, and said motor being directly mounted on the front end of pan 10 with its feed wires extending through the opening or offset 28 of door 9 in to the storage chamber of the refrigerator cabinet and to a suitable source of electric current supply, such as an outlet receptacle provided in said storage chamber or space of the refrigerator cabinet. The receptacle 10 of Figures 8 and 9 will of course be somewhat shorter than the receptacle of Figures 1 to 3 inclusive in order to provide a sufficient space at the front of the compartment and in front of said receptacle 10 to accommodate the motor 24 without interfering with closing of door 9. Further, the front end portion of shaft 12 in this form of the invention may be carried by a removable bearing member 31 on which is also mounted the casing of gearing 25 and motor 24, the rear end of shaft 12 being simply removably engaged in the bearing 11 at the rear end of receptacle 10. The arrangement is such that when the motor 24 is lifted upwardly along with the casing of gearing 25, the bearing member 31 is slid upwardly and disengaged from the front wall of receptacle 10 so that the rear end of shaft 12 may be disengaged from the rear bearing 11, thus effecting quick disconnection of the stirrer actuating mechanism from the receptacle 10 to facilitate discharge of the frozen material. The stirrers 18, which have been previously disconnected from the carriers 14, may then be readily removed from the receptacle 10 for cleaning or the like.

It will be particularly seen that both forms of the invention provide for continuous freezing and agitation of the material in the freezer receptacle while the compartment for said receptacle is closed, and particularly without requiring repeated opening of the door 6 of the refrigerator cabinet. Rapid and proper freezing of food stuffs requiring agitation is accordingly insured by an apparatus which is simple, durable and efficient. It is especially noted that the invention embraces a light and portable freezer unit which may be readily installed completely within existing models of automatic domestic refrigerators with little or no modification of the refrigerator construction and at no cost for installation.

While I have shown and described preferred embodiments of my invention, it will be understood that other changes in the details and arrangement of parts may be resorted to without departing from the spirit of the invention or the scope of the appended claims. For instance, there would obviously be no patentable distinction of an improvement nature in providing only one stirrer and carrier therefor cooperating with intersecting spiral grooves or threads extending substantially the entire length of the stirrer actuating shaft, although more efficient results are attainable by the provision of two coacting and oppositely moving stirrers as illustrated and described.

What I claim as new is:

1. A freezer mechanism for automatic domestic refrigerators wherein a refrigerating unit defines a refrigerating chamber, comprising a pan-like freezer receptacle adapted for removable reception within said refrigerating chamber so as to leave a space within the latter in front of said receptacle, a reciprocable stirrer in said receptacle, means for reciprocating said stirrer including a horizontal driven shaft removably journaled near the top of said freezer receptacle, said driven shaft projecting at the front end of said receptacle, a motor for driving said driven shaft, and operative connection between said motor and said driven shaft including a gearing positioned to occupy the space in front of said freezer receptacle, a flexible shaft connecting said gearing with the power shaft of said motor and depending below the freezer receptacle, and means for mounting the motor in the refrigerator below the refrigerating chamber.

2. A freezer mechanism for automatic domestic refrigerators wherein a refrigerating unit defines a refrigerating chamber, comprising a pan-like freezer receptacle adapted for removable reception within said refrigerating chamber so as to leave a space within the latter in front of said receptacle, a stirrer in said receptacle, actuating means for said stirrer including a horizontal driven shaft mounted near the top of and removably associated with said freezer receptacle, said driven shaft projecting at the front end of said receptacle, a motor for driving said driven shaft, an operative connection between said motor and said driven shaft including a gearing positioned to occupy the space in front of said freezer receptacle, a flexible shaft connecting said gearing with the power shaft of said motor and depending below the freezer receptacle to permit mounting of the motor in the refrigerator below the refrigerating chamber, and mounting means for said motor including a suction cup attached to the motor casing and engageable with a wall of the refrigerator to permit quick attachment or detachment of the motor relative to the refrigerator wall and to prevent accidental displacement of the motor relative to said wall when attached to the latter.

3. A freezer mechanism for automatic domestic refrigerators wherein a refrigerating unit defines a refrigerating chamber, comprising a pan-like freezer receptacle adapted for removable reception within said refrigerating chamber so as to leave a space within the latter in front of said receptacle, a stirrer in said receptacle, actuating means for said stirrer including a horizontal driven shaft mounted near the top of and removably associated with said freezer receptacle, said driven shaft projecting at the front end of said receptacle, a motor for driving said driven shaft, an operative connection between said motor and said driven shaft including a gearing positioned to occupy the space in front of said freezer receptacle, a flexible shaft connecting said gearing with the power shaft of said motor and depending below the freezer receptacle to permit mounting of the motor in the refrigerator below the refrigerating chamber, and mounting means for said motor including a suction cup attached to the motor casing and engageable with a wall of the refrigerator to permit quick attachment or detachment of the motor relative to the refrigerator wall and to prevent accidental displacement of the motor relative to said wall when attached to the latter, said suction cup being yieldable so as to form a resilient sound deadening mounting for the motor.

4. A freezer mechanism for automatic domestic refrigerators wherein a refrigerating unit defines a refrigerating chamber, comprising an elongated pan-like freezer receptacle, a stirrer in said receptacle, and power-operated actuating means for said stirrer including a driven shaft journaled centrally and longitudinally of the freezer receptacle near the top of the latter and having intersecting right and left hand spiral grooves formed therein with the grooves connected at their adjacent opposite ends, and a carrier slidably engaged with said driven shaft and having a key alternately engageable in the respective spiral grooves, said stirrer being attached to and carried so as to be reciprocated with the latter longitudinally of the freezer receptacle upon rotation of said driven shaft, said driven shaft being removably mounted on said freezer receptacle, and a quick detachable connection between the stirrer and said carrier, said stirrer being devoid of connection with said freezer receptacle.

5. A freezer mechanism for automatic domestic refrigerators wherein a refrigerating unit defines a refrigerating chamber, comprising a freezer receptacle in the form of an elongated pan, a pair of stirrers within said pan, and power-operated means for reciprocating said stirrers longitudinally of said pan alternately toward and away from each other, said last-named means including a horizontal driven shaft journaled centrally and longitudinally of said pan near the top of the latter and having sets of intersecting right and left hand threads formed therein at opposite ends of the same, carriers slidable on said driven shaft and each operatively associated with a different spirally grooved portion of the latter so as to be reciprocated upon turning of said shaft, said stirrers being attached to the respective carriers for movement thereby.

6. A freezer mechanism for automatic domestic refrigerators wherein a refrigerating unit defines a refrigerating chamber, comprising a freezer receptacle adapted for removable reception within said refrigerating chamber, a stirrer in said receptacle, reciprocating means for said stirrer including a horizontal driven shaft mounted near the top of said freezer receptacle and having intersecting right and left hand threads formed therein and connected at their adjacent opposite ends, a motor for driving said driven shaft, a constant positive driving connection between said motor and said driven shaft, and an electrical overload circuit breaker incorporated in the electrical feed line of said motor and actuated by and upon an increase of the amperage in said feed line for breaking the electric circuit to said motor when a predetermined resistance to the movement of said stirrer and the driven shaft of said motor is offered by the frozen material, which resistance is transmitted to the electrical feed line for increasing the amperage to the point required to actuate the circuit breaker.

ELLIS FULTON.